United States Patent [19]
Lin

[11] Patent Number: 5,971,415
[45] Date of Patent: Oct. 26, 1999

[54] BICYCLE FRONT FORK PACKING DEVICE

[76] Inventor: Wen-Hwa Lin, No. 812, Chung Shen Rd., Tieh San Tsun, Wei Pu Hsiang, Taichung Hsien, Taiwan

[21] Appl. No.: 09/003,801

[22] Filed: Jan. 7, 1998

[51] Int. Cl.[6] .................................................. B62K 21/18
[52] U.S. Cl. ........................................ 280/280; 403/371
[58] Field of Search ................................... 280/279, 280; 403/365, 370, 371, 373, 374.1; 74/551.1; 384/545, 543, 546

[56] References Cited

U.S. PATENT DOCUMENTS

| | | | |
|---|---|---|---|
| 5,678,836 | 10/1997 | Chen | 280/280 |
| 5,681,119 | 10/1997 | Marui | 384/545 |
| 5,687,616 | 11/1997 | Marui | 74/551.1 |
| 5,810,380 | 9/1998 | Lin | 280/279 |

*Primary Examiner*—Kevin Hurley
*Attorney, Agent, or Firm*—Varndell & Varndell, PLLC

[57] ABSTRACT

A bicycle front fork packing device including a bottom split taper ring supported within a top cover of a bearing assembly at the top end of the head tube of a bicycle frame, a top split taper ring mounted on the bottom split taper ring around the top coupling tube of a front fork and stopped at a bottom end of the vertical tube of a handlebar stem, and a sealing cover covered on the top cover of the bearing assembly around the bottom end of the vertical tube of the handlebar, the bottom split taper ring being moved up with the bearing assembly and the top split taper ring being forced to expand by the bottom split taper ring and to firmly engage with the inside wall of the sealing cover when the vertical tube of the handlebar stem and the top coupling tube of the front fork are fastened tight.

1 Claim, 3 Drawing Sheets

BICYCLE FRONT FORK PACKING DEVICE

BACKGROUND AND SUMMARY OF THE INVENTION

The present invention relates to a bicycle front fork packing devices adapted to secure the top coupling tube of the front fork of a bicycle to the head tube thereof, and relates more particularly to such a bicycle front fork packing device which seals out rain water when installed.

A regular bicycle front fork packing device is generally comprised of a locating socket mounted around the top coupling tube of the front fork and supported on a ball bearing above the head tube of the bicycle frame, the locating socket having an outer thread and a tapered center through hole, and a split holding-down ring fitted into the tapered center through hole of the outer thread of the locating socket to compress the holding-down ring by forcing an inside annular flange thereof into an outside annular groove on the holding-down ring, causing the holding-down ring and the locating socket to securely fix the front fork to the head tube. Because the design of the outer thread of the locating socket and the annular groove of the holding-down ring complicates the manufacturing process of the bicycle front fork packing device, the manufacturing cost of the bicycle front fork packing device is high. Further, this packing device can not effectively seal out rain water.

The present invention provides a bicycle front fork packing structure which is inexpensive to manufacture, and easy to install. According to the preferred embodiment of the present invention, the bicycle front fork packing structure comprises a bearing assembly mounted on and partially fitted into the top end of the head tube around the top coupling tube of the front fork, a bottom split taper ring supported within the top cover of the bearing assembly, a top split taper ring mounted on the bottom split taper ring around the top coupling tube of the front fork and stopped at the bottom end of the vertical tube of the handlebar stem, and a sealing cover covered on the top cover of the bearing assembly around the bottom end of the vertical tube of the handlebar. The bottom split taper ring is moved up with the bearing assembly and the top split taper ring is forced to expand by the bottom split taper ring and to firmly engage with the inside wall of the sealing cover when the vertical tube of the handlebar stem and the top coupling tube of the front fork are fastened tight.

DETAILED DESCRIPTION OF THE PREFERRED EMBODIMENT

Figure 1:
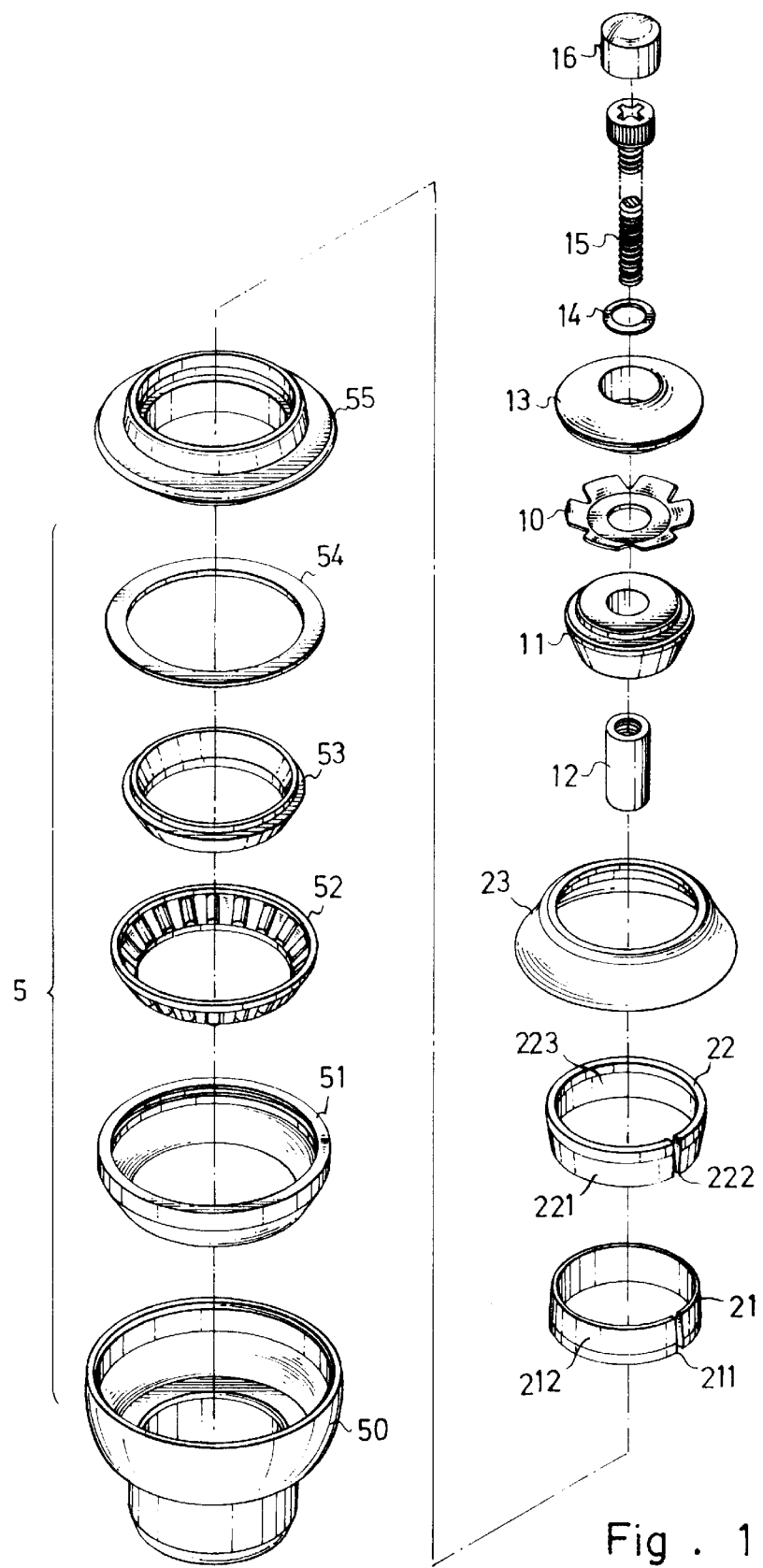
FIG. 1 is an exploded view of a bicycle front fork packing structure according to the preferred embodiment of the present invention.
Figure 2:
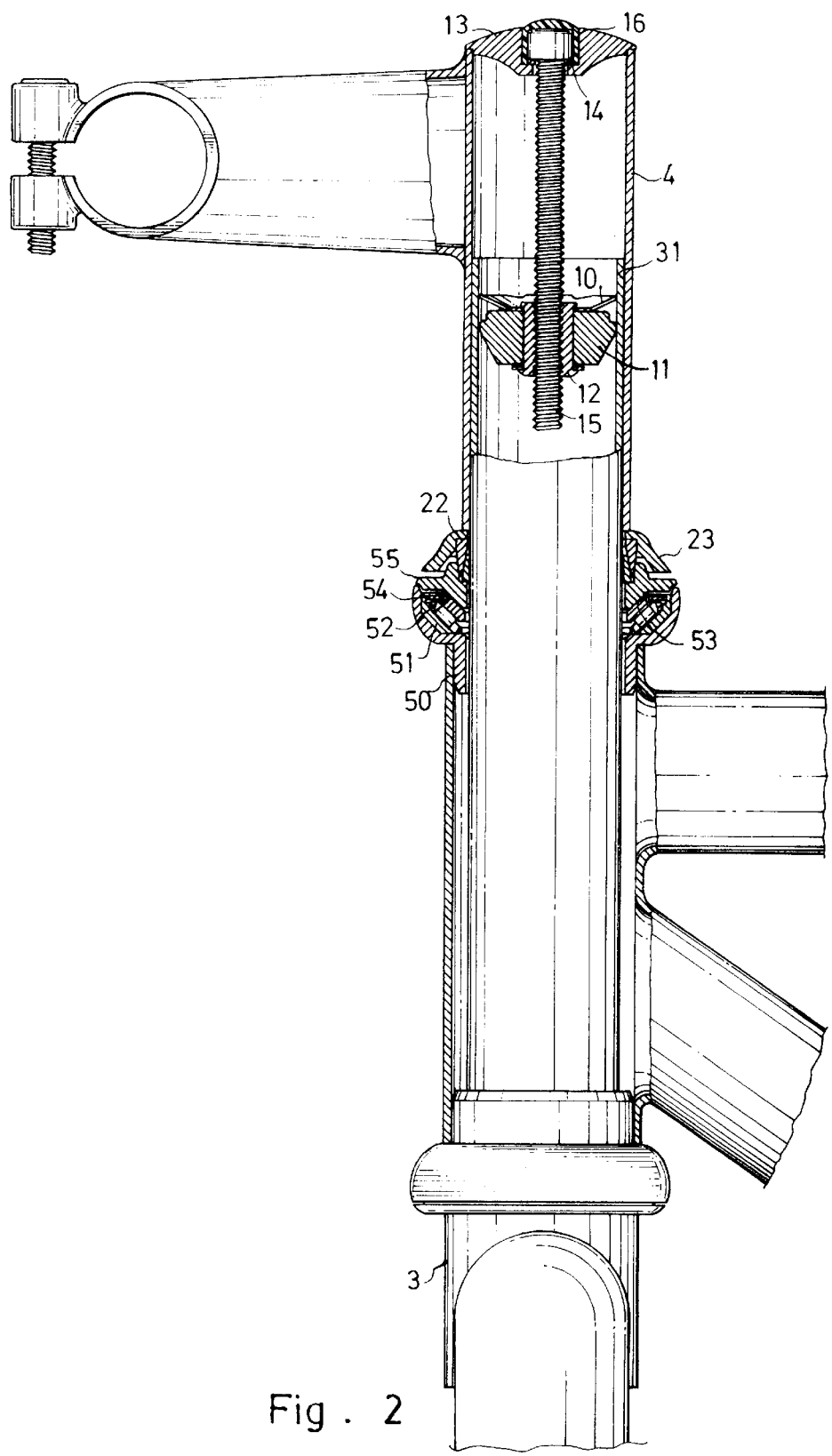
FIG. 2 is a sectional assembly view of FIG. 1.
Figure 3:
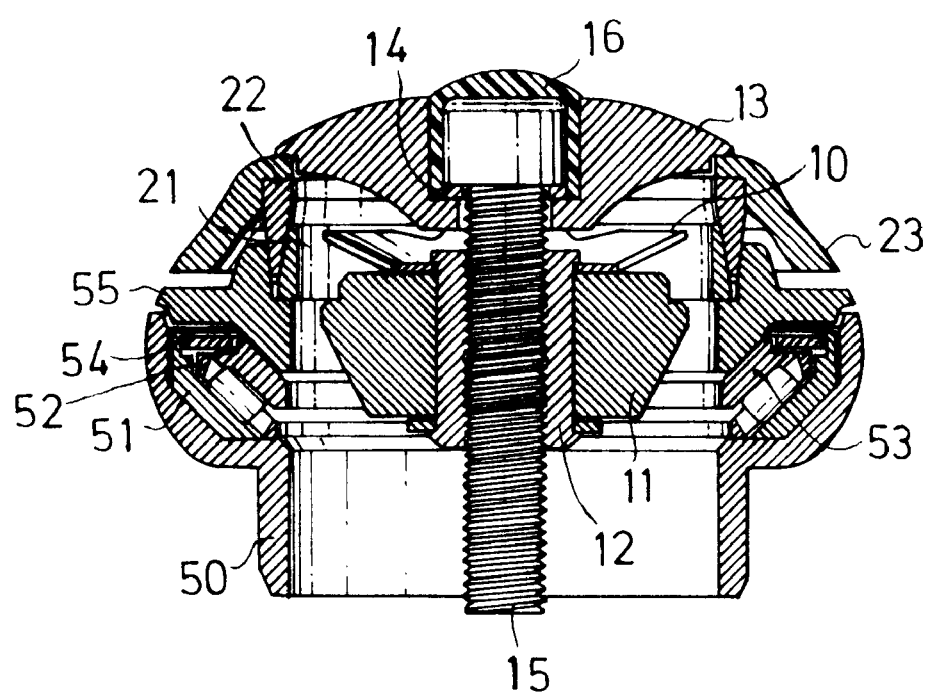
FIG. 3 is a sectional view showing the bicycle front fork packing structure packed for delivery.

Referring to FIGS. 1 to 2, a top coupling tube 31 of a front fork 3 is inserted through a head tube of a bicycle frame from the bottom into a vertical tube 4 of a handlebar stem, and secured in place by a handlebar stem packing device, which is comprised of a hollow cone 11 fitted into the top coupling tube 31 of the front fork 3, an internally threaded bush 12 mounted within the hollow cone 11, an inner cap 13 fixedly fastened to the top end of the top coupling tube 31 of the front fork 3 inside the vertical tube 4 of the handlebar stem, a screw bolt 15 mounted in a countersunk hole on the blocked top end of the vertical tube 4 of the handlebar stem and inserted through the center through hole on the inner cap 13 and threaded into the internally threaded bush 12, a resilient plate 10 mounted around the screw bolt 15 and retained between the cone 11 and the inner cap 13, a ring cushion 14 mounted within the countersunk hole on the blocked top end of the vertical tube 4 of the handlebar stem around the screw bolt 15, and an outer cap 16 covered on the head of the screw bolt 15.

Referring to FIGS. 1 and 2 again, a front fork packing device is provided to securely fix the top coupling tube 31 of the front fork 3 to the head tube of the bicycle frame. The front fork locating device is comprised of a bearing assembly 5 mounted on the top end of the head tube of the bicycle frame around the top coupling tube 31 of the front fork 3, a bottom split taper ring 21, a top split taper ring 22, and a sealing cover 23.

The bearing assembly 5 is comprised of a cup 50 supported on and partially fitted into the top end of the head tube of the bicycle frame around the top coupling tube 31 of the front fork 3, a bottom bearing block 51 mounted within the cup 50, a top bearing block 53 supported on the bottom bearing block 51 around the top coupling tube 31 of the front fork 3, a rotary bearing 52 mounted between the bottom bearing block 51 and the top bearing block 53 around the top coupling tube 31 of the front fork 3, a top cover 55 mounted around the top coupling tube 31 of the front fork 3 and covered on the cup 50 over the bearing blocks 51; 53, and a packing ring 54 mounted within the cup 50 and retained between the top cover 55 and the bottom bearing block 51 above the top bearing block 53.

The sealing cover 23 is mounted around the vertical tube 4 of the handlebar stem and covered on to the top cover 55 of the bearing assembly 5. The bottom split taper ring 21 is mounted around the top coupling tube 31 of the front fork 3 within the sealing cover 23 and the top cover 55 of the bearing assembly 5 and supported on an inside step inside the top cover 55. The top split taper ring 22 is mounted within the sealing cover 23 around the top coupling tube 31 of the front fork 3 and stopped below the vertical tube 4 of the handlebar stem. The bottom split taper ring 21 comprises a split 211, and a tapered outside wall 212. The diameter of the tapered outside wall 212 of the bottom split taper ring 21 gradually reduces from the bottom side toward the top side. The top split taper ring 22 comprises a tapered outside wall 221, a split 222, and a tapered inside wall 223. The outer diameter of the tapered outside wall 221 and inner diameter of the tapered inside wall 223 gradually increase from the bottom side toward the top side. The tapered inside wall 223 of the top split taper ring 22 is disposed in close contact with the tapered outside wall 212 of the bottom split taper ring 21. When the screw bolt 15 is fastened tight, the top coupling tube 31 of the front fork 3 is moved upwards in the vertical tube 4 of the handlebar stem, the bottom split taper ring 21 is carried upwards with the bearing assembly 5 relative to the top split taper ring 22 (because the top split taper ring 22 is stopped below the vertical tube 4 of the handlebar stem), thereby causing the top split taper ring 22 to be expanded and forced into right engagement with the inside wall of the sealing cover 23.

What is claimed is:

1. A bicycle front fork packing device comprising a bearing assembly mounted on a top end of a head tube of a bicycle frame around a top coupling tube of a front fork, a bottom split taper ring supported within a top cover of said bearing assembly, a top split taper ring mounted on said bottom split taper ring around the top coupling tube of said front fork and stopped at a bottom end of a vertical tube of a handlebar stem, and a sealing cover covered on the top cover of said bearing assembly around the bottom end of the vertical tube of said handlebar stem, wherein said bottom split taper ring comprises a split, and a tapered outside wall, the diameter of the tapered outside wall of said bottom split taper ring gradually reducing from a bottom side toward a top side; said top split taper ring comprises a split, a tapered inside wall disposed in contact with the tapered outside wall of said bottom split taper ring, and a tapered outside wall disposed in contact with an inside wall of said sealing cover, the diameters of the tapered inside wall and tapered outside wall of said top split taper ring gradually increasing from a bottom side toward a top side in reverse to the tapered outside wall of said bottom split taper ring.

* * * * *